(12) United States Patent
Hogan (10) Patent No.: US 11,620,864 B2
(45) Date of Patent: Apr. 4, 2023

(54) SYSTEMS AND METHODS FOR VIEWING ONBOARD MACHINE DATA

(71) Applicant: Caterpillar Paving Products Inc., Brooklyn Park, MN (US)

(72) Inventor: Lee M. Hogan, Mackinaw, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 333 days.

(21) Appl. No.: 16/878,024

(22) Filed: May 19, 2020

(65) Prior Publication Data

US 2021/0366211 A1 Nov. 25, 2021

(51) Int. Cl.
*G07C 5/08* (2006.01)
*B62D 15/02* (2006.01)
*G06F 3/04847* (2022.01)
*G07C 3/00* (2006.01)
*G06F 3/0482* (2013.01)
*G07C 5/12* (2006.01)
*B60K 35/00* (2006.01)

(52) U.S. Cl.
CPC ............ *G07C 5/0841* (2013.01); *B60K 35/00* (2013.01); *B62D 15/02* (2013.01); *G06F 3/0482* (2013.01); *G06F 3/04847* (2013.01); *G07C 3/00* (2013.01); *G07C 5/0816* (2013.01); *G07C 5/0825* (2013.01); *G07C 5/12* (2013.01); *B60K 2370/115* (2019.05); *B60K 2370/152* (2019.05); *B60K 2370/167* (2019.05)

(58) Field of Classification Search
None
See application file for complete search history.

(56) References Cited

U.S. PATENT DOCUMENTS

| | | | | |
|---|---|---|---|---|
| 5,995,001 | A * | 11/1999 | Wellman | B66F 17/003 340/685 |
| 7,024,306 | B2 | 4/2006 | Katsuaki et al. | |
| 7,206,689 | B1 * | 4/2007 | Johnson | F02D 41/2451 701/55 |
| 7,872,587 | B2 * | 1/2011 | Hindryckx | A01D 41/127 340/684 |
| 8,930,039 | B2 * | 1/2015 | Murray | A01D 41/127 701/1 |
| 8,935,060 | B2 * | 1/2015 | Baumgarten | G05B 13/021 701/1 |
| 8,983,739 | B2 | 3/2015 | Faivre | |
| 9,206,589 | B2 | 12/2015 | Price | |
| 9,280,859 | B2 | 3/2016 | Itatsu et al. | |

(Continued)

FOREIGN PATENT DOCUMENTS

EP 1498297 B1 5/2008

*Primary Examiner* — Jason A Pringle-Parker (57) ABSTRACT

A systems and method for plotting and viewing onboard machine data with graphical user interfaces on a mobile heavy duty machine is disclosed. The method also includes displaying a list of machine systems on an onboard display of the machine. The method further includes receiving at the display a selection of a machine system from the list of machine systems. The method additionally includes displaying one or more parameters at the display based on the selected machine system. The method additionally includes receiving at the display a selection of a parameter. The method also includes displaying a graphical representation, comprising an x-axis and y-axis, of real-time data of the parameter.

17 Claims, 6 Drawing Sheets

(56) References Cited

U.S. PATENT DOCUMENTS

| | | | |
|---|---|---|---|
| 9,575,628 B2* | 2/2017 | Meegan | G06F 3/0488 |
| 10,077,177 B2 | 9/2018 | Lynn et al. | |
| 10,222,941 B2* | 3/2019 | Lucas | B60K 35/00 |
| 10,754,466 B2* | 8/2020 | Ochenas | G06F 3/041 |
| 2006/0287792 A1* | 12/2006 | Jarrett | A01B 79/005 |
| | | | 701/50 |
| 2013/0096895 A1* | 4/2013 | Willard | B60W 50/0098 |
| | | | 703/8 |
| 2014/0298259 A1* | 10/2014 | Meegan | G06F 3/04842 |
| | | | 715/810 |
| 2015/0262091 A1* | 9/2015 | Yamagata | G06Q 10/04 |
| | | | 345/440 |
| 2016/0318465 A1* | 11/2016 | Brooks | G06F 3/04847 |
| 2017/0021769 A1* | 1/2017 | Izumikawa | B60R 1/00 |
| 2017/0090741 A1 | 3/2017 | Tentinger et al. | |
| 2018/0364698 A1* | 12/2018 | Blank | G06F 3/04883 |

* cited by examiner

SYSTEMS AND METHODS FOR VIEWING ONBOARD MACHINE DATA

TECHNICAL FIELD

The present disclosure relates generally to methods and systems for displaying data associated with heavy-equipment machines.

BACKGROUND

Machines that operate at work sites may collect, track, and analyze system data, and may further be capable of displaying the system data to a machine operator. However, limited data recording and storing capabilities of machines may restrict the amount of data available to the machine operator. Further, complex graphical user interfaces may make it difficult to easily access desired machine information. Accordingly, a desire exists for a simple way to access and display machine data to operators in meaningful format wherein data trends can be discerned.

U.S. Pat. No. 7,024,306 discloses a vehicle evaluation system that determines whether or not an operation is detrimental to fuel economy, and calculates fuel consumed in excess due to the detrimental vehicle operation. The system displays to the operator the excess fuel consumption amount. In particular, the operator display may include a fuel economy display area for displaying the current and past fuel economy. As a result, an operator of the vehicle can recognize the driving operation which caused the deterioration in fuel economy, and this can be used as a reference when improving driving operations. However, the system '306 patent may be limited, for example, by the data provided (fuel economy data) and in the user interfaces provided.

The systems and methods of the present disclosure may solve one or more of the problems set forth above and/or other problems in the art. The scope of the current disclosure, however, is defined by the attached claims, and not by the ability to solve any specific problem.

SUMMARY

In one aspect, a method for plotting and viewing onboard machine data with graphical user interfaces on a mobile heavy duty machine is disclosed. The method may include the steps comprising: displaying a list of machine systems on an onboard display of the machine; receiving at the display a selection of a machine system from the list of machine systems; displaying one or more parameters at the display based on the selected machine system; receiving at the display a selection of a parameter; and displaying a graphical representation, comprising an x-axis and y-axis, of real-time data of the parameter.

In another aspect, a system for plotting and viewing onboard machine data with graphical user interfaces on a mobile heavy duty machine is disclosed. The system may include: at least one controller that executes instructions for: displaying a list of machine systems on an onboard display of the machine; receiving at the display a selection of a machine system from the list of machine systems; displaying one or more parameters at the display based on the selected machine system; receiving at the display a selection of a parameter; and displaying a graphical representation, comprising an x-axis and y-axis, of real-time data of the parameter. In yet another aspect, a non-transitory computer readable medium storing instructions for plotting and viewing onboard machine data with graphical user interfaces on a mobile heavy duty machine is disclosed. The computer readable medium may include at least one controller, configured to implement instructions for: displaying a list of machine systems on an onboard display of the machine; receiving at the display a selection of a machine system from the list of machine systems; displaying one or more parameters at the display based on the selected machine system; receiving at the display a selection of a parameter; and displaying a graphical representation, comprising an x-axis and y-axis, of real-time data of the parameter.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic.

Figure 1:
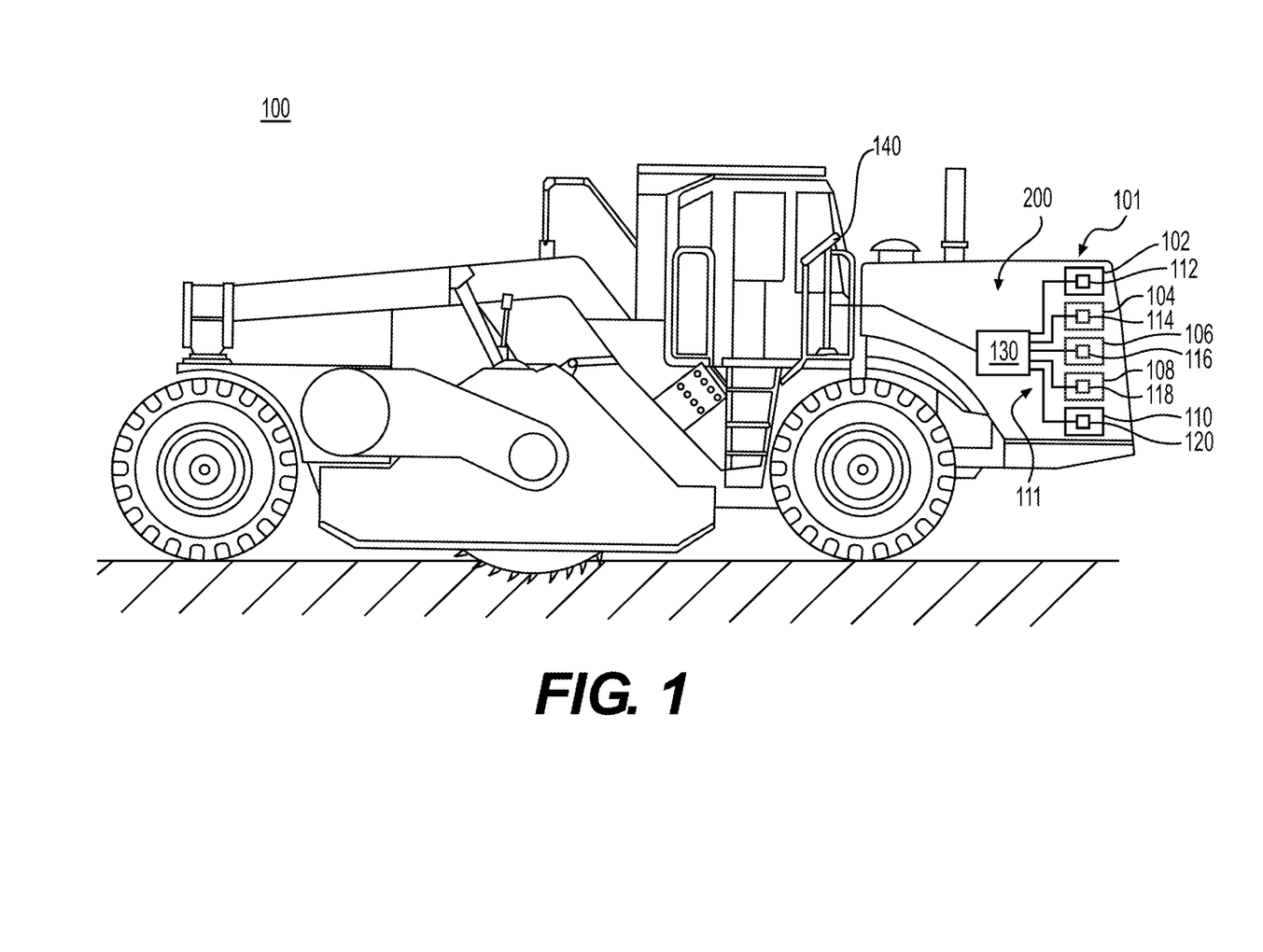
FIG. 1 is a schematic diagram of a heavy-equipment machine according to aspects of this disclosure.

FIG. 1 illustrates an exemplary machine 100. While a rotary mixer/reclaimer type heavy duty mobile machine will be described in association with machine 100, this disclosure is not limited to rotary mixer machines. Rather, this disclosure may be used on any type of heavy duty mobile machine 100 capable of producing and monitoring system data of the machine 100. For example, this disclosure could be used on cold planer machines, paving machines, compactor machines, backhoe loader machines, dozer machines, excavator machines, etc.

The machine 100 may include various machine systems 101, and a control system 200 associated with the machine systems 101. The machine systems 101 may include any of the various systems included on the machine 100. For example, machine systems 101 may include general machine systems 102, fluid systems 104, engine system 106, powertrain system 108, and steering system 110. More or less machine systems 101 may be included on machine 100.

General machine systems 102 of machine 100 may include, for example, electrical systems, operator cab systems, and/or auxiliary motor systems. Fluid systems 104 of machine 100 may include, for example, hydraulic systems, coolant systems, lubricant systems, and/or pneumatic systems. Engine system 106 of machine 100 may include, for example, an internal combustion engine system or other type of prime mover system, including fuel systems, air intake systems, and/or exhaust and aftertreatment systems. Powertrain system 108 of machine 100 may include, for example, a transmission system, drive motor systems, and/or braking systems. Steering system 110 of machine 100 may include components associated with the steering of machine 100 such as an operator steering device (e.g. joystick, steering wheel, etc.), and the hardware used to pivot the wheels or tracks of the machine 100. Other systems of machine 100 may include, for example, a grade and slope system, a leveling system, and/or a rotor system.

Figure 2:
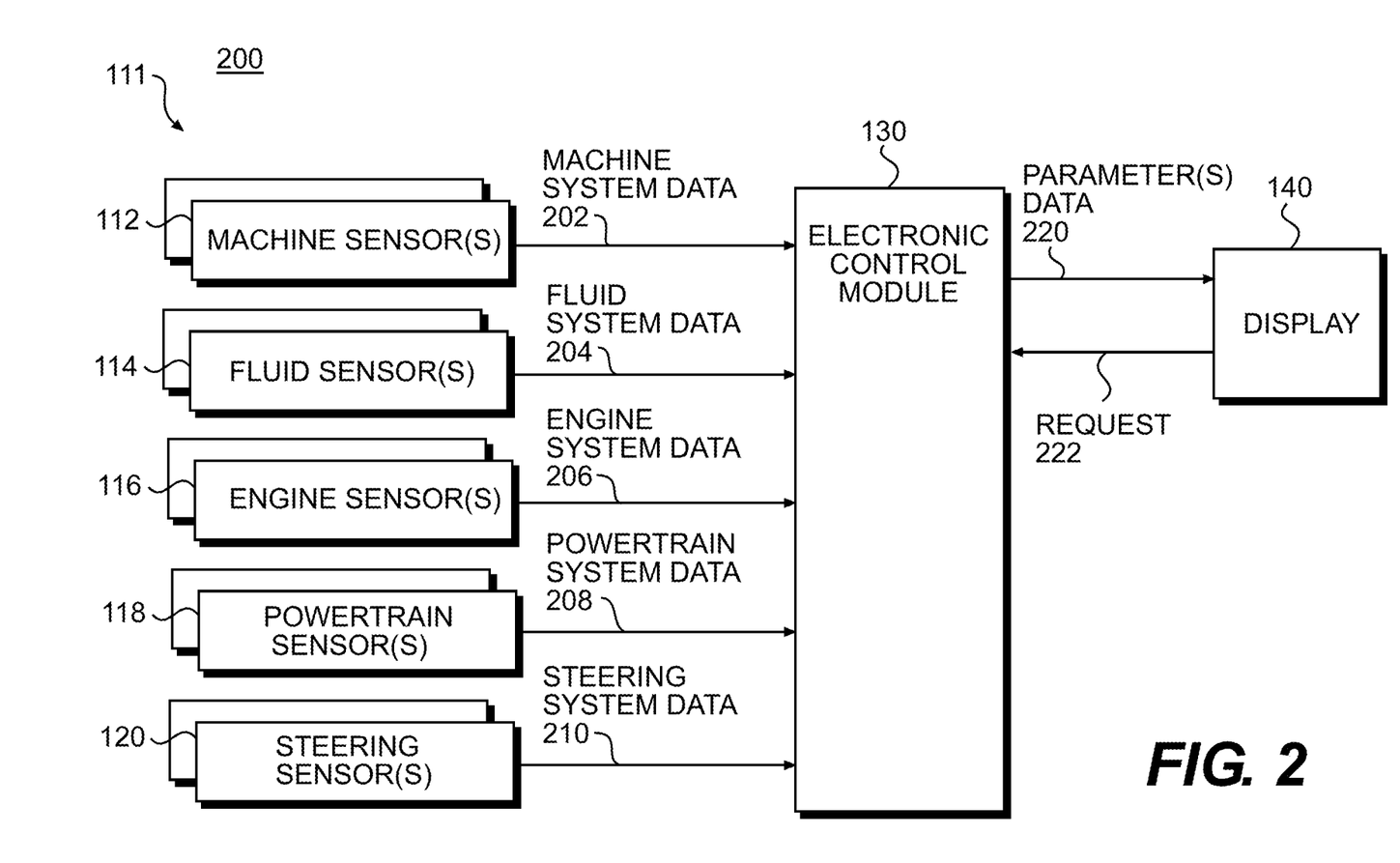
FIG. 2 is a block diagram of a control system of the machine of FIG. 1.

Referring to FIGS. 1 and 2, control system 200 may include, for example, one or more controllers in the form of one or more electronic control modules ("ECM") 130, a plurality of machine sensors 111, and an operator display 140. The plurality of sensors 111 may measure or sense various aspects of the machine systems 101. The machine sensors 111 may include, for example, one or more general machine system sensors 112 producing machine system data 202 by measuring, sensing, or determining various aspects of the machine 100 (e.g., machine system voltage, operator in seat switch status, etc.); one or more fluid system sensors 114 producing fluid system data 204 by measuring, sensing, or determining various aspects of the fluid systems 104 of the machine 100 (e.g., emulsion system status, fluid level and temperature, etc.); one or more engine system sensors 116 producing engine system data 206 measuring, sensing, or determining various aspects of the engine system 106 of the machine 100 (e.g., engine load factor, fuel pressure, fuel consumption rate, fuel temperature, aftertreatment parameters, intake pressure and temperature, EGR parameters, etc.); one or more powertrain system sensors 118 producing powertrain system data 208 measuring, sensing, or determining various aspects of the powertrain system 108 of the machine 100 (e.g., drive motor speeds, drive circuit pressures, propel lever status); and one or more steering system sensors 120 producing steering system data 210 measuring, sensing, or determining various aspects of the steering system 110 of the machine 100 (e.g., steering joystick position, steering cylinder position, etc.). Machine sensors 111 may take any form, type, or style, and may be hardware or virtual sensors.

ECM 130 may send signals to, and receive signals from, the plurality of machine systems 101, machine sensors 111, and the operator display 140 during operation of the machine 100. As used herein, the phrase "during operation of the machine" is defined as the operation of the machine 100 by the user or operator as part of a task or job on a work site, and does not include a maintenance type operation or monitoring of the machine 100 by, e.g., maintenance personnel. ECM 130 may be in any conventional form and may include, for example, hardware, software, and firmware for executing various instructions or functions, including those described in connection with the method of FIG. 3 and the graphical user interfaces of FIGS. 4-6. For example, ECM 130 may include one or more processors, memory, communication systems, clocks, and/or other appropriate hardware. ECM 130 may be, for example, a single or multi-core processor, a digital signal processor, microcontroller, a general purpose central processing unit (CPU), and/or other conventional processor or processing/controlling circuit or controller. The memory may include, for example, read-only memory (ROM), random access memory (RAM), flash or other removable memory, or any other appropriate and conventional memory. Communication systems associated with ECM 130 (e.g., between ECM, machine systems 101, machine sensors 111, and display 140) may include, for example, any conventional wired and/or wireless communication systems such as Ethernet, Bluetooth, and/or wireless local area network (WLAN) type systems.

Figure 5:
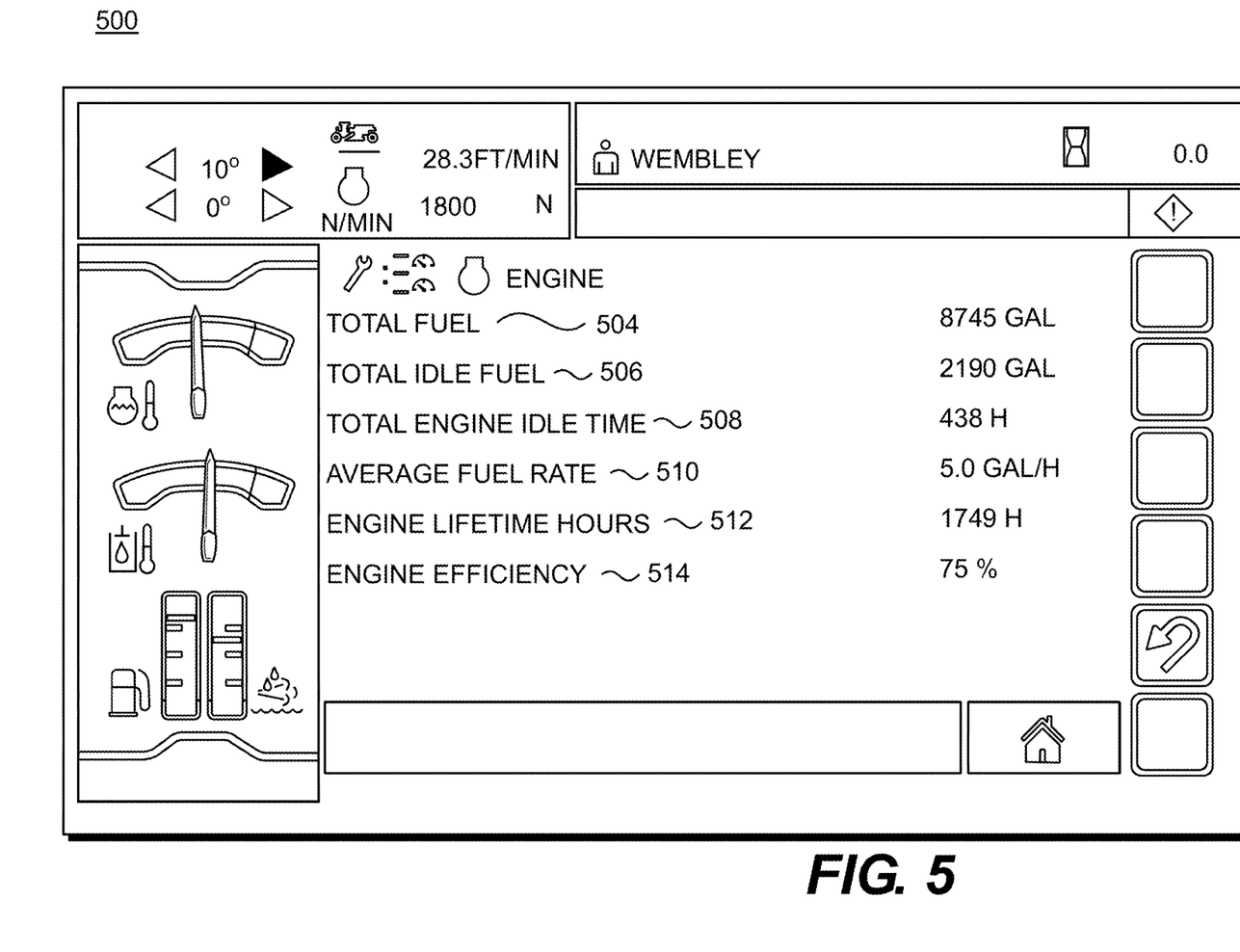

With reference to FIG. 2, the sensors 111 send data (202-210) to ECM 130 where the data is analyzed. The analyzed data results in parameter data 220 that is provided to display 140. Data from display 140, such as operator selection or request data 222, can be provided back to ECM 130. The parameter data 220 may be data associated with a particular machine system 101, and parameter data 220 may be direct sensor data from sensors 111, or values derived from the data of one or more sensors 111. The derived data may include the use of maps or look-up tables, equations stored in, or accessed by, ECM 130, and other data stored in or sensed by machine 100. For example, parameter data 220 associated with the engine system 106 may be derived from one or more engine system sensors 116, and as shown in FIG. 5, may include parameters such as a total fuel value 504, a total idle fuel value 506, a total engine idle time value 508, an average fuel rate value 510, an engine lifetime hours value 512, an engine efficiency value 514. ECM 130 may derive parameter data 220 for each of the machine systems 101. As will be described below in connection with the method of FIG. 3, and the graphical user interface of FIG. 6, ECM 130 may provide a graphical representation comprising an x-axis and a y-axis of parameter data 220.

Display 140 may include any conventional display of the machine 100 that is used to assist in performing or monitoring aspects of the machine during operation of the machine. The display 140 may be configured to receive the parameter data 220 and provide the graphical user interfaces of FIGS. 4-6, including the parameter data 220. The display 140 may include a user input portion in the form of a touch-screen, keyboard, mouse, etc. to receive operator input and send such input back to the ECM 130 in the form of request data 222. Further, machine 100 may include more than one display 140, and the one or more displays may be located at any location on machine 100. Alternatively, or in addition, a display 140 maybe be located remote from machine 100, such as on a mobile device or in a technician's station, with data being sent and received wirelessly or via any other appropriate connection.

INDUSTRIAL APPLICABILITY

The system and methods of the present disclosure may be used in association with any mobile heavy duty machine capable of producing and monitoring data of the machine 100. The system and methods disclosed may assist in the analysis of onboard machine data to improve, for example, the efficiency, maintenance, and productivity of the machine 100.

Figure 3:
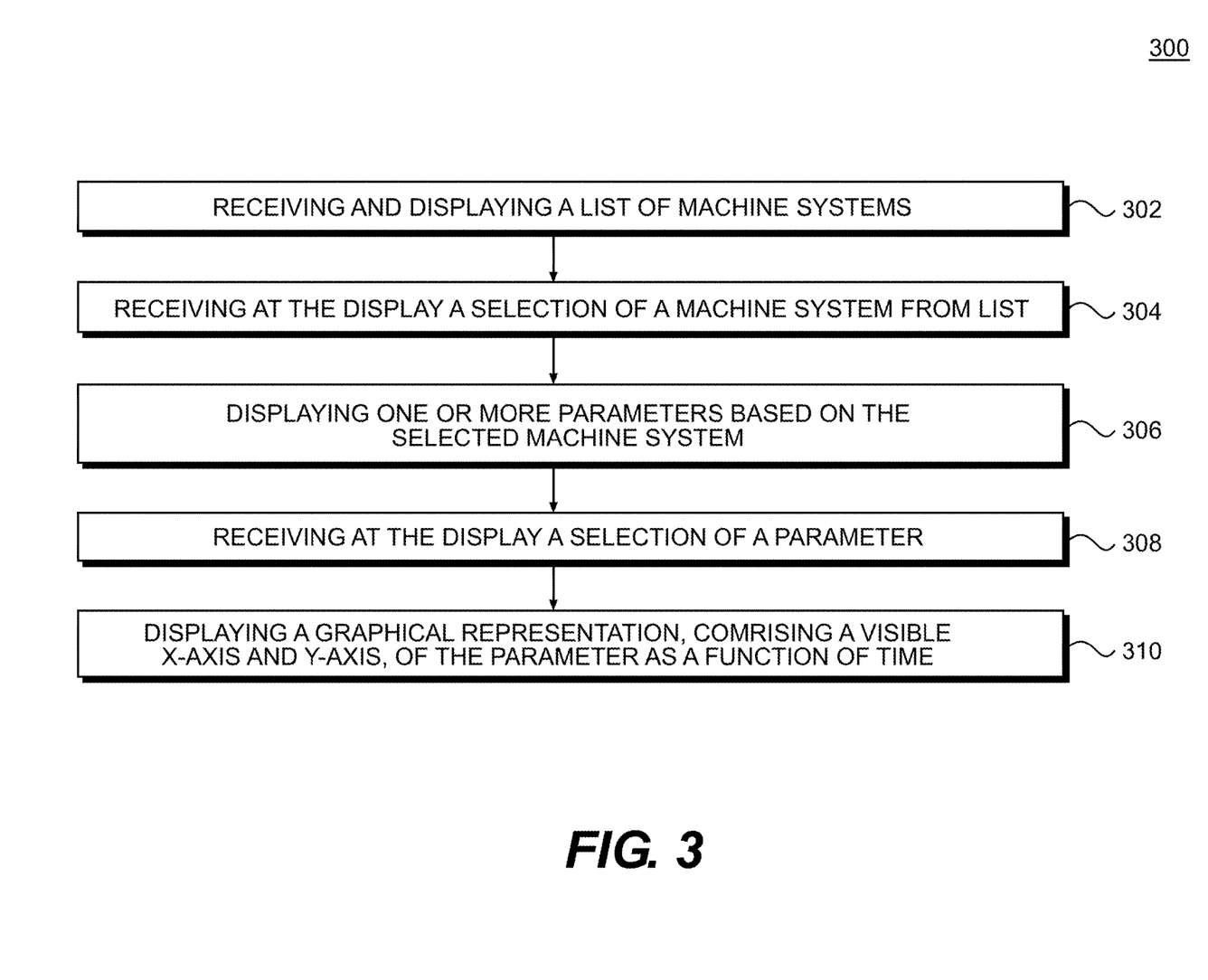
FIG. 3 is a flowchart depicting an exemplary method associated with the control system of FIG. 2.

FIG. 3 is a flowchart depicting an exemplary method 300 for plotting and viewing onboard machine data within a graphical user interface on display 140. While the flowchart of FIG. 3 will be described as implemented with sensors 111, ECM 130, and display 140, it is understood that more or less components and data may be used. In step 302, display 140 may receive and display a list of machine systems. As shown in the graphical user interface 400 of FIG. 4, the list of machine systems may be provided in hierarchical menu format and correspond to machine systems 101, and may be displayed as a menu of selectable machine systems 101, including, but not limited to, machine systems 404, fluid monitor systems 406, engine systems 408, powertrain systems 410, and/or steering systems 412. The display 140 may compile the menu of machine systems based on the parameter data 220 or other data from ECM 130.

Figure 4:
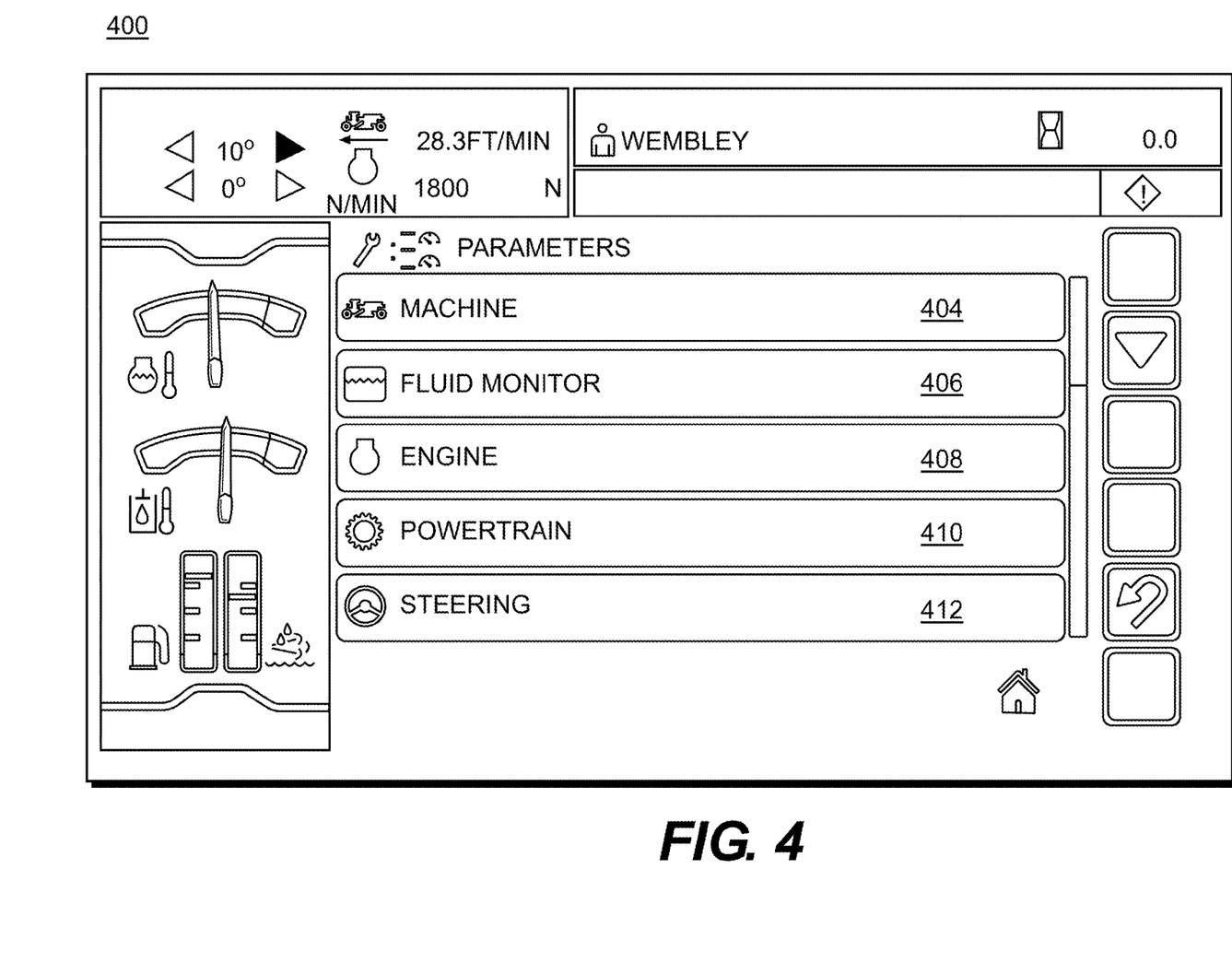
FIGS. 4-6 depict a series of graphical user interfaces of a display of the machine of FIG. 1 in accordance with the method of FIG. 3.

In step 304, display 140 receives a selection of a machine system from the list of machine systems of graphical user interface 400. The selection may be made by an operator of machine 100 or a technician, and may be implemented by a touch screen type input portion associated with display 140, or any other input device or system. An indication of the user selected machine system from the menu is sent back to ECM 130 as request data 222 (FIG. 2).

In step 306, the display 140 provides a graphical user interface 500 as shown in FIG. 5, providing a list or menu of parameters in a hierarchical menu format based on the selected machine system. In the example shown in FIG. 5, the selected machine system is the engine system 106, and the displayed list or menu of parameters are associated with the engine system 106, and may include or be derived from engine system data 206 from engine sensors 116. The listed parameters may include a total fuel value 504, a total idle fuel value 506, a total engine idle time value 508, an average fuel rate value 510, an engine lifetime hours value 512, and/or an engine efficiency value 514. Similar graphical user interfaces may be provided for each of the different machine systems 101.

In step 308, display 140 receives a selection of a parameter from the list of parameters (504-514) of graphical user interface 500. Similar to step 304, the selection may be made by an operator of machine 100 or a technician, and may be implemented by a touch screen type input portion of display 140 or any other input device or system. The selected parameter from the menu is sent back to ECM 130 as request data 222 (FIG. 2).

Figure 6:
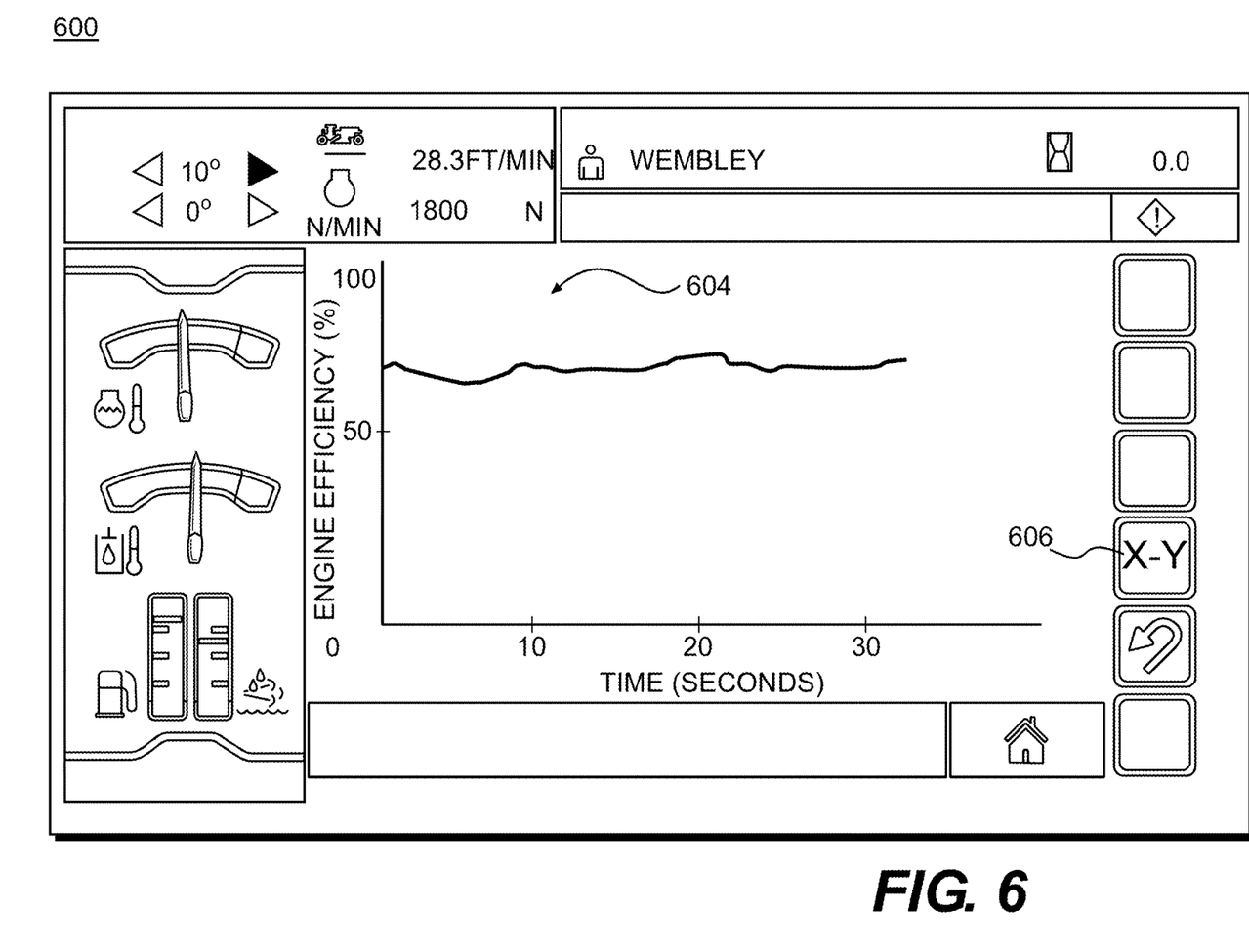

In step 310, display 140 provides a graphical user interface 600 as shown in FIG. 6, providing a graphical representation 604 of the selected parameter data of step 308. The graphical representation 604 includes a plot correlating x-axis data and y-axis data. As shown in FIG. 6, the selected parameter is engine efficiency 514 (FIG. 5), and the plot includes x-axis data corresponding to time (e.g. seconds, minutes, hours), and the y-axis data corresponds to efficiency of the engine. However, the example of selecting the parameter of engine efficiency is not meant to be limiting, as any of the above-described parameters can be calculated, selected, and displayed, or other parameters of the machine 100. The plot of graphical representation 604 begins providing the data upon selection of the parameter (step 308), and thus graphical representation 604 displays a real-time recording of the parameter over time during the operation of the machine 100. As such, the plot provides parameter data as a function of time during operation of the machine 100. As noted above, the phrase "during operation of the machine" is defined as the operation of the machine 100 by the user or operator as part of a task or job on a work site, as opposed to a maintenance type operation or monitoring of the machine 100 by, e.g., maintenance personnel.

The recording and display of the selected parameter data via graphical representation 604 may continue until a new parameter to plot is selected, or may terminate when the user interface 600 is exited, e.g. via a "back" or "home" user selection. Graphical representation may display the real-time data for a default time-period, such as 30 seconds as shown in FIG. 6, or the display time window may be more or less, corresponding to an available memory, or selectable by the user. While the plot of graphical representation 604 is described as providing a recording of real-time data, it is understood that the disclosure is not so limited, and that stored historical data may additionally be provided, such as historical data over a previous time period—such as the previous 30 seconds. The time period of historical parameter data could be a user selected time period, or correspond to a time period corresponding to the available memory of the ECM 130 or display 140. The historical data could also correspond to the duration of machine use by a specific operator, or historical data for the duration of a particular job of the machine 100, or another time period.

In an alternative plot of graphical representation 604, time scale x-axis could be replaced with another parameter to plot parameters against one another. For example, the graphical representation 604 could be modified to include average fuel rate on the x-axis to show the change in engine efficiency with respect to fuel rate.

As noted above, graphical representation 604 may be generated for any parameter (parameter data 220) of any of the engine systems 101 of machine 100. Thus, the disclosed system allows the x-axis and y-axis graphical representation 604 of any sensor data (e.g. 202-210), or any values derived therefrom, associated with machine 100. Further, graphical representation 604 may provide more than one x-axis and y-axis plot of parameter data, and/or may provide more than one parameter data in a single x-axis and y-axis plot. While graphical representation 604 shows the parameter data as a line, it is understood that the parameter data can be displayed on the x-axis and y-axis plot in any appropriate manner, such as spaced indicators or vertical or horizontal bars. Also, while a two dimensional x-axis and y-axis plot is shown in FIG. 6, it is understood that a three dimensional plot may alternatively be displayed (e.g. x-axis, y-axis, and z-axis).

The graphical user interfaces 400, 500, and 600, may include additional menus, lists, icons, text, buttons, and settings than those described above. For example, the user interfaces 400, 500, and 600 may include system indicators, home and navigation buttons, machine operator identification legends, and notifications. Further, the user interface 600 of FIG. 6 may include a user selected scaling functionality to allow the operator to selectively adjust the scale provided by the x-axis and/or y-axis plot of the graphical representation 604. For example, the plot of graphical representation 604 may default to a scaling based on the min and max of the displayed data, but a scaling icon 606 may be provided to allow operator to select from a number of scaling step sizes by depressing the scaling icon 606. Such a selective scaling functionality may allow for zooming in or out of the data provided in the plot of graphical representation 604, such as by changing an x-axis time scale (e.g. from seconds to minutes, or vice versa) or by a zoom factor (e.g., x10). The graphical user interfaces 400, 500, and 600 may additionally include further customizable layout settings, menu settings, etc.

The disclosed systems and methods of the present disclosure provide, for example, a simple and straightforward series of user interfaces for accessing and analyzing real-time parameter data 220 of the systems 101 of machine 100. The user interfaces 400, 500, and 600 further provide a versatility by allowing the viewing of any of the various sensed data (via parameter data 220) of the systems 101 of machine 10 in real-time for a desired period of time. Because the plot of graphical representation 604 provides real-time data, upon selection of a parameter, it is not necessary for the machine to store extensive amounts of historical data for all of the parameters or sensor data. Further, the plot having an x-axis and y-axis provides for a straightforward way to view the parameter data to see variations and influences on the parameter. By viewing the parameter data in such a manner, an operator or technician can see trends that are indicative of inefficiency, the need for replacement of parts or maintenance, or warning of impending problems with the machine 100. Further, such a plot of graphical representation 604 may provide the operator or technician with insights to the operation of machine 100 that may have been difficult to display without a service tool and during downtime of the machine.

It will be apparent to those skilled in the art that various modifications and variations can be made to the disclosed machine without departing from the scope of the disclosure. Other embodiments of the machine will be apparent to those skilled in the art from consideration of the specification and practice of the graphical user interface disclosed herein. It is intended that the specification and examples be considered as exemplary only, with a true scope of the disclosure being indicated by the following claims and their equivalents.

What is claimed is:

1. A method for plotting and viewing onboard machine data of a mobile heavy duty machine with graphical user interfaces of the machine and during operation of the machine, comprising:
    displaying a list of machine systems on an onboard display of the machine, wherein the displayed list of machine systems includes a general machine system, a fluid system, an engine system, a powertrain system, and a steering system of the machine;
    receiving at the display a selection of a machine system from the list of machine systems;
    displaying one or more parameters at the display based on the selected machine system, wherein the one or more parameters indicate analyzed sensor data collected by one or more sensors during the operation of the machine by the operator as a part of a task on a worksite, and wherein the sensor data is not collected during maintenance and monitoring of the machine;
    receiving at the display a selection of a parameter from the one or more parameters;
    displaying a graph with the display of the machine, wherein the graph indicates, on an x-axis and a y-axis, real-time data of the selected parameter during the operation of the machine by the operator as the part of the task on the worksite, wherein the graph is displayed during the operation of the machine and not during the maintenance and the monitoring of the machine, and wherein the real-time data of the selected parameter is displayed for a pre-determined time period based on available memory of the machine; and
    recording the real-time data only for the currently selected parameter, wherein the recording continues until a new parameter is selected.

2. The method of claim 1, wherein the one or more parameters are associated with the machine systems and are based at least in part on sensor data of the machine system.

3. The method of claim 1, wherein the graph provides a recording of the real-time data of the selected parameter during the operation of the machine.

4. The method of claim 3, wherein the recording of the real-time data of the selected parameter initiates with the receiving of the selection of the parameter.

5. The method of claim 1, where the x-axis of the graph includes an average fuel rate and the y-axis of the graph corresponds to efficiency of the machine, and wherein the graph includes scaling functionality to selectively adjust a scale provided by the x-axis and the y-axis.

6. The method of claim 5, further including selectively scaling the average fuel rate.

7. The method of claim 1, wherein the display includes a touch-screen display configured to receive the selected machine system, and the selected parameter.

8. A system for plotting and viewing onboard machine data of a mobile heavy duty machine with graphical user interfaces of the machine and during operation of the machine, comprising:
    at least one controller that executes instructions for:
        displaying a list of machine systems on an onboard display of the machine, wherein the displayed list of machine systems includes a general machine system, a fluid system, an engine system, a powertrain system, and a steering system of the machine;
        receiving at the display a selection of a machine system from the list of machine systems;
        displaying one or more parameters at the display based on the selected machine system, wherein the one or more parameters indicate analyzed sensor data collected by one or more sensors during the operation of the machine by the operator as a part of a task on a worksite, and wherein the sensor data is not collected during maintenance and monitoring of the machine;
        receiving at the display a selection of a parameter from the one or more parameters;
        displaying a graph with the display of the machine, wherein the graph includes an x-axis and a y-axis on which real-time data of the selected parameter during the operation of the machine by the operator as the part of the task on the worksite is indicated with historical data for a time-period, wherein the historical data is collected during the time-period in response to a request from an operator of the machine, and wherein the graph is displayed during the operation of the machine and not during the maintenance and the monitoring of the machine, and wherein the real-time data of the selected parameter is displayed for a pre-determined time period based on available memory of the machine; and
        recording the real-time data only for the currently selected parameter, wherein the recording continues until a new parameter is selected.

9. The system of claim 8, wherein the one or more parameters are associated with the machine systems and are based at least in part on sensor data of the machine system, and wherein the real-time data of the parameter is displayed based, at least in part, on a pre-determined time threshold, user selection, or a combination thereof.

10. The system of claim 8, wherein the graph provides a recording of the real-time data and the historical data of the selected parameter during the operation of the machine, and wherein the historical data indicates duration of machine use by a specific operator.

11. The system of claim 10, wherein the recording of the real-time data of the selected parameter initiates with the receiving of the selection of the parameter.

12. The system of claim 8, where the x-axis of the graph includes a time scale and the y-axis of the graph corresponds to efficiency of the machine.

13. The system of claim 8, wherein the controller further executes instructions for selectively scaling a time scale included in the x-axis of the graph, wherein the graph provides a warning.

14. The system of claim 8, wherein the display includes a touch-screen display configured to receive the selected machine system, and the selected parameter.

15. A non-transitory computer readable medium storing instructions for plotting and viewing onboard machine data of a mobile heavy duty machine with graphical user interfaces of the machine and during operation of the machine, that when executed by at least one controller, cause one or more controllers to implement instructions for:

displaying a list of machine systems on an onboard display of the machine, wherein the displayed list of machine systems includes a general machine system, a fluid system, an engine system, a powertrain system, and a steering system of the machine;

receiving at the display a selection of a machine system from the list of machine systems;

displaying one or more parameters at the display based on the selected machine system, wherein the one or more parameters indicate analyzed sensor data collected by one or more sensors during the operation of the machine by the operator as a part of a task on a worksite, and wherein the sensor data is not collected during maintenance and monitoring of the machine;

receiving at the display a selection of a parameter from the one or more parameters;

displaying a graphical representation with the display of the machine, wherein the graphical representation includes a graph plotting an x-axis and a y-axis that indicate real-time data of the parameter, the parameter being determined during the operation of the machine by the operator as the part of the task on the worksite based on sensor data from a plurality of sensors, wherein storing of historical data is based, at least in part, on selection of the parameter, and wherein the graph is displayed during the operation of the machine and not during the maintenance and the monitoring of the machine, and wherein the real-time data of the selected parameter is displayed for a pre-determined time period based on available memory of the machine; and     recording the real-time data only for the currently selected parameter, wherein the recording continues until a new parameter is selected.

16. The non-transitory computer readable medium of claim 15, wherein the one or more parameters are associated with the machine systems and are based at least in part on the sensor data of the machine system.

17. The non-transitory computer readable medium of claim 15, wherein the graphical representation provides a recording of the real-time data of the selected parameter during the operation of the machine.

\* \* \* \* \*